(12) United States Patent
Zhang et al.

(10) Patent No.: US 8,407,611 B2
(45) Date of Patent: Mar. 26, 2013

(54) APPARATUS AND METHOD FOR DESIGNING GRAPHICAL USER INTERFACES (GUIS) HAVING DIFFERENT FIDELITIES

(75) Inventors: Rui Zhang, Beijing (CN); John R. Hajdukiewicz, Florham Park, NJ (US); Shi Qiang Wang, Beijing (CN); Daoping Zhang, Beijing (CN); Geoffrey Ho, Toronto (CA)

(73) Assignee: Honeywell International Inc., Morristown, NJ (US)

( * ) Notice: Subject to any disclaimer, the term of this patent is extended or adjusted under 35 U.S.C. 154(b) by 812 days.

(21) Appl. No.: 12/185,302

(22) Filed: Aug. 4, 2008

(65) Prior Publication Data

US 2010/0031171 A1 Feb. 4, 2010

(51) Int. Cl.
G06F 3/00 (2006.01)
(52) U.S. Cl. ...................................................... 715/762
(58) Field of Classification Search .................. 715/762, 715/763, 771, 835, 846
See application file for complete search history.

(56) References Cited

U.S. PATENT DOCUMENTS

| | | | |
|---|---|---|---|
| 5,971,581 A | 10/1999 | Gretta et al. | |
| 5,974,257 A | 10/1999 | Austin | |
| 6,036,366 A | 3/2000 | Andreasson | |
| 6,195,591 B1 | 2/2001 | Nixon et al. | |
| 6,425,120 B1 | 7/2002 | Morganelli et al. | |
| 6,449,624 B1 | 9/2002 | Hammack et al. | |
| 6,718,533 B1 | 4/2004 | Schneider et al. | |
| 7,089,530 B1 | 8/2006 | Dardinski et al. | |
| 8,234,619 B2 * | 7/2012 | Polly et al. | 717/100 |
| 2003/0195639 A1 | 10/2003 | Nixon et al. | |
| 2006/0052884 A1 * | 3/2006 | Staples et al. | 700/83 |

OTHER PUBLICATIONS

"GUI widget", wikipedia.org, Jul. 6, 2008, 3 pages.
"Graphical user interface", wikipedia.org, Aug. 4, 2008, 7 pages.
"Widget toolkit", wikipedia.org, Jul. 29, 2008, 2 pages.
"Graphical user interface builder", Aug. 2, 2008, 3pages.
"Microsoft Office PowerPoint 2007 product overview", microsoft.com, 2008, 9 pages.
"Visual Basic", wikipedia.org, Aug. 3, 2008, 7 pages.
"The Form Editor", NetBeans.org, 5 pages.
"Flex overview", Adobe.com, 2008, 3 pages.
"Flex 3 benefits", Adobe.com, 2008, 2 pages.
"Flex Builder 3 features", Adobe.com, 2008, 4 pages.
Datasheet, "Adobe Flash CS3 Professional, Create and Deliver Rich, Interactive Content", Adobe, 2007, 2 pages.
Steven Peterson, "IMVU Flash Widget API—Getting Started Guide", Google, Nov. 2007, 5 pages.
"Spry Widget Model", Adobe, 2006, 4 pages.
Datasheet, "Adobe Dreamweaver CS3", Adobe, 2008, 3 pages.

(Continued)

Primary Examiner — Thanh Vu

(57) ABSTRACT

A method includes defining a placeholder widget having a property and defining a prototype graphical user interface (GUI) having an instance of the placeholder widget. The method also includes presenting the prototype GUI to a user, where an appearance of the instance of the placeholder widget is based on the property of the placeholder widget. The method further includes replacing the instance of the placeholder widget in the prototype GUI with an instance of another widget. In addition, the method includes updating the presentation of the prototype GUI using the instance of the other widget. Replacing the instance of the placeholder widget with the instance of the other widget could include transforming an instance of a lower fidelity placeholder widget into an instance of a higher fidelity widget. The property of the placeholder widget could include a textual property, an image property, and/or a graphics property.

20 Claims, 5 Drawing Sheets

OTHER PUBLICATIONS

Datasheet, "Adobe Dreamweaver CS3, Design, Develop, and Maintain Standards-Based Websites and Applications", Adobe, 2007, 2 pages.

James B. Dabney, et al., "Mastering Simulink", Oct. 2003, pp. 5, 32-33, 36-42, 48 and 330-361.

* cited by examiner

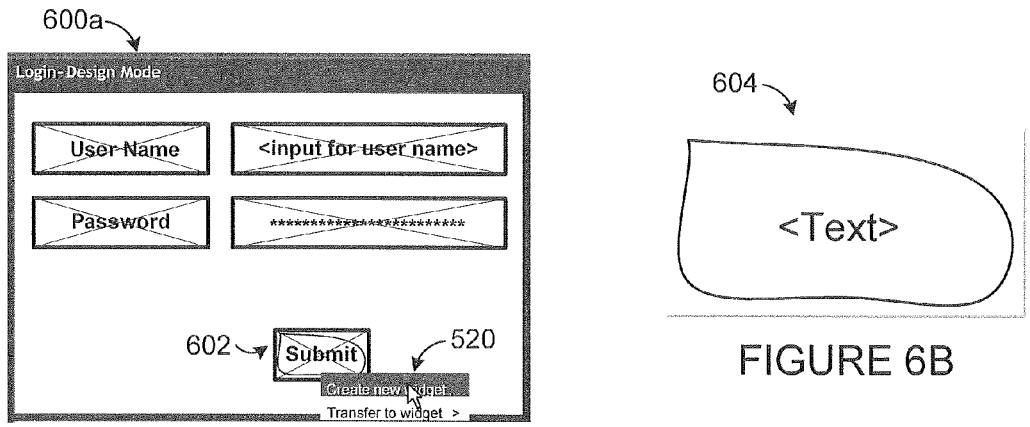
FIGURE 6A
FIGURE 6B
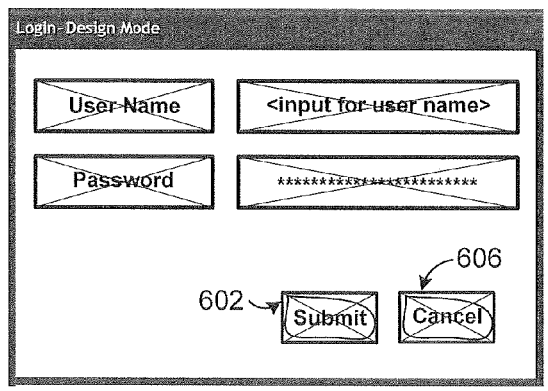
FIGURE 6C
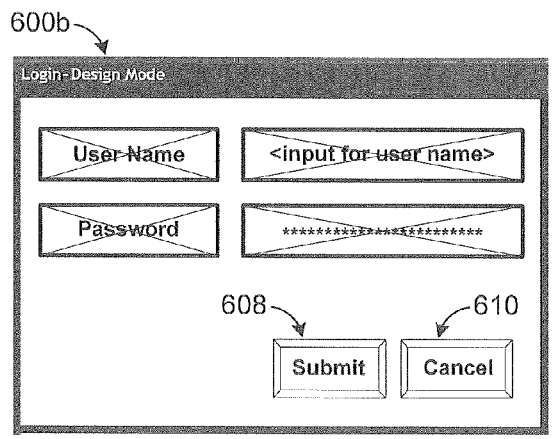
FIGURE 6D

APPARATUS AND METHOD FOR DESIGNING GRAPHICAL USER INTERFACES (GUIS) HAVING DIFFERENT FIDELITIES

TECHNICAL FIELD

This disclosure relates generally to user interface design. More specifically, this disclosure relates to an apparatus and method for designing graphical user interfaces (GUIs) having different fidelities.

BACKGROUND

Graphical user interface (GUI) design is becoming more and more important in the development of software. Prototyping is a widely used technique for creating GUIs as part of software development. Prototypes can be classified according to the "fidelity" with which they resemble the actual product, such as in terms of appearance, interaction, function, and form. For example, lower fidelity prototypes may have less resemblance to an actual software product and often have lower quality. Higher fidelity prototypes may have more resemblance to an actual software product and often have higher quality.

Traditionally, lower fidelity prototypes are "throwaway" prototypes, meaning those prototypes are often created and later discarded. This typically makes it difficult to trace or manage comments related to the lower fidelity prototypes. This also often requires developers or other personnel to use different tools to create different prototypes of different fidelities, which increases the time and cost associated with the development and reduces productivity.

SUMMARY

This disclosure provides an apparatus and method for designing graphical user interfaces (GUIs) having different fidelities.

In a first embodiment, a method includes defining a placeholder widget having a property and defining a prototype graphical user interface (GUI) having an instance of the placeholder widget. The method also includes presenting the prototype GUI to a user, where an appearance of the instance of the placeholder widget is based on the property of the placeholder widget. The method further includes replacing the instance of the placeholder widget in the prototype GUI with an instance of another widget. In addition, the method includes updating the presentation of the prototype GUI using the instance of the other widget.

In particular embodiments, replacing the instance of the placeholder widget with the instance of the other widget includes transforming the instance of the placeholder widget into the instance of the other widget. The transformation includes transferring the property of the placeholder widget to the instance of the other widget. The property of the placeholder widget could include a textual property, an image property, and/or a graphics property. The instance of the placeholder widget may have a lower fidelity than the instance of the other widget.

In other particular embodiments, transforming the instance of the placeholder widget into the instance of the other widget includes presenting a list of specified widget types to the user and receiving a selection of one of the specified widget types from the user. The instance of the placeholder widget is transformed into an instance of the selected widget type.

In yet other particular embodiments, the method further includes altering the property of the placeholder widget and automatically updating the instance of the placeholder widget in the prototype GUI.

In still other particular embodiments, the prototype GUI further includes an instance of a non-placeholder widget. Also, the method could further include defining multiple prototype GUIs collectively having multiple instances of multiple widgets, where at least two of the prototype GUIs have different fidelities.

In a second embodiment, an apparatus includes at least one memory configured to store information defining a placeholder widget having a property. The apparatus also includes at least one processor configured to receive information defining a prototype graphical user interface (GUI) having an instance of the placeholder widget, present the prototype GUI to a user, and replace the instance of the placeholder widget with an instance of another widget in the prototype GUI. An appearance of the instance of the placeholder widget is based on the property of the placeholder widget.

In a third embodiment, a computer readable medium embodies a computer program. The computer program includes computer readable program code for defining multiple widgets including a placeholder widget having a property. The computer program also includes computer readable program code for defining multiple prototype graphical user interfaces (GUIs) having multiple instances of multiple widgets, where at least one of the instances includes an instance of the placeholder widget. The computer program further includes computer readable program code for presenting the prototype GUIs to one or more users, where an appearance of the instance of the placeholder widget is based on the property of the placeholder widget. In addition, the computer program includes computer readable program code for replacing the instance of the placeholder widget with an instance of another widget in the prototype GUIs. The instance of the other widget has a higher fidelity than the instance of the placeholder widget.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 3A through 7 illustrate example techniques for designing GUIs having different fidelities according to this disclosure.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
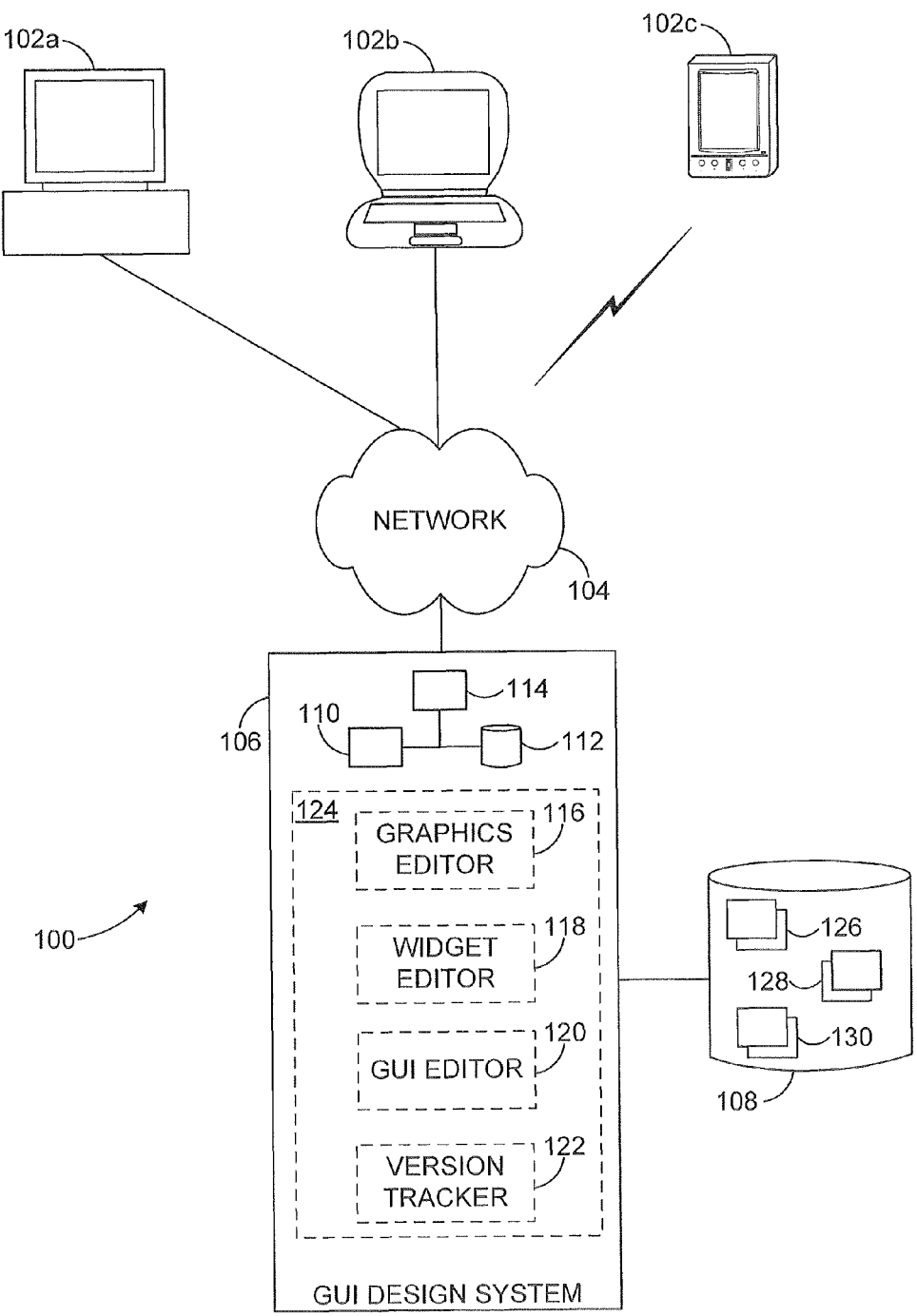
FIG. 1 illustrates an example system for designing graphical user interfaces (GUIs) having different fidelities according to this disclosure.

FIG. 1 illustrates an example system 100 for designing graphical user interfaces (GUIs) having different fidelities according to this disclosure. The embodiment of the system 100 shown in FIG. 1 is for illustration only. Other embodiments of the system 100 may be used without departing from the scope of this disclosure.

In this example, various user devices 102a-102c communicate over a network 104 with a GUI design system 106. The GUI design system 106 allows users to design various graphical user interfaces, such as GUIs for software products or other products in development. The GUI design system 106 also supports various functions associated with the design of the graphical user interfaces, such as the ability to transform lower fidelity GUIs into higher fidelity GUIs. In this way, the system 100 can support the design of GUIs at varying levels of fidelity. The system 100 can also reduce the time and expense of creating higher fidelity GUIs by reusing various data provided during the design of lower fidelity GUIs.

In the illustrated example, each of the user devices 102a-102c is coupled to or communicates over the network 104. Each of the user devices 102a-102c represents any suitable device, system, or portion thereof that facilitates interaction with the GUI design system 106. In FIG. 1, the user devices 102a-102c include a desktop computer (user device 102a), a laptop computer (user device 102b), and a personal digital assistant (user device 102c). These examples are for illustration only. Any other or additional types of user devices may be used in the system 100.

The network 104 facilitates communication between components of the system 100. For example, the network 104 may communicate Internet Protocol (IP) packets, frame relay frames, Asynchronous Transfer Mode (ATM) cells, or other suitable information between network addresses. The network 104 may include one or more local area networks (LANs), metropolitan area networks (MANs), wide area networks (WANs), all or a portion of a global network such as the Internet, or any other communication system or systems at one or more locations. The network 104 may also operate according to any appropriate type of protocol or protocols, such as Ethernet, IP, X.25, frame relay, or any other protocol.

The GUI design system 106 is coupled to the network 104 and to a database 108. The GUI design system 106 supports the design, creation, modification, and management of graphical user interfaces. For example, the GUI design system 106 allows users to define widgets, which represent components or building blocks for GUIs. The GUI design system 106 also allows users to define GUIs that include those widgets.

Widgets could include features such as buttons, text boxes, lists, slider bars, drop-down menus, and other components of graphical user interfaces. A widget can represent a single component or a collection of components. A widget could also be classified as a lower or higher fidelity widget. As particular examples, widgets can be used to define both lower and higher quality buttons used in GUIs. Lower fidelity widgets could be used by human factor and marketing personnel during the design of lower fidelity GUI prototypes, and higher fidelity widgets could be used by GUI designers during the design of higher fidelity GUI prototypes. The GUI design system 106 could further create higher fidelity widgets based on lower fidelity widgets. The GUI design system 106 can support various other functions to facilitate the design, creation, modification, and management of various GUIs (such as those functions described below).

The GUI design system 106 includes any hardware, software, firmware, or combination thereof for designing graphical user interfaces having different fidelities. As a particular example, the GUI design system 106 could include one or more processors 110 and one or more memories 112 storing instructions and data used, generated, or collected by the one or more processors 110. The GUI design system 106 could also include one or more network interfaces 114 facilitating communication over one or more networks, such as an Ethernet interface or a wireless transceiver.

In particular embodiments, the GUI design system 106 includes various software applications for performing functions related to the design of graphical user interfaces. For example, the GUI design system 106 could include a graphics editor 116, which may allow users to create or provide sketches, images, or graphics (such as those used in lower fidelity widgets). The graphics editor 116 includes any hardware, software, firmware, or combination thereof for creating or editing graphics. As particular examples, the graphics editor 116 could represent a paintbrush program or other program for receiving user input from a mouse, a light pen, or other input device. The graphics editor 116 could also represent a program for receiving and editing scanned images, such as scanned images of hand-drawn buttons or other GUI components.

The GUI design system 106 could also include a widget editor 118, which can be used to create, modify, and manage widgets for use in lower and higher fidelity GUIs. For example, the widget editor 118 may allow users to create and modify buttons, text boxes, lists, and any other or additional components used in GUIS.

The widget editor 118 also facilitates the creation and use of "placeholder" widgets. A placeholder widget represents a widget used in a GUI to hold the place for another (non-placeholder) widget, which can be added to the GUI at a later time. In some embodiments, placeholder widgets contain lower fidelity content, such as lower quality text, images, or graphics. As a particular example, a button placeholder widget may contain a graphic provided through the graphics editor 116, such as a roughly drawn rectangle representing the button. In this way, lower fidelity content can be used to form placeholder widgets, and those placeholder widgets can be easily used and reused in one or multiple lower fidelity GUI prototypes. As described below, these placeholder widgets can later be replaced by or converted into higher fidelity widgets to create higher fidelity GUI prototypes. The widget editor 118 includes any hardware, software, firmware, or combination thereof for editing widgets.

The GUI design system 106 may further include a GUI editor 120, which can be used to create, modify, and manage GUIs having different fidelities. For example, the GUI editor 120 could allow users to design various GUIs containing widgets defined by the widget editor 116 (including placeholder widgets). The GUI editor 120 includes any hardware, software, firmware, or combination thereof for editing GUIs.

In addition, the GUI design system 106 may include a version tracker 122. In some embodiments, different versions of widgets and GUIs can be created and edited using the editors 118-120, and the version tracker 122 tracks the different versions of the widgets and GUIs. As a particular example, the version tracker 122 could track who created each version of a widget or GUI, who edited each version of the widget or GUI, and the changes between versions of the widget or GUI. The version tracker 122 includes any hardware, software, firmware, or combination thereof for tracking changes made to widgets or GUIs.

In some embodiments, some or all of the various applications 116-122 could form a suite 124, which represents a collection of applications that could be distributed together. In other embodiments, only some of the applications 116-122 could be distributed together.

In this example, the database 108 is coupled to the GUI design system 106. The database 108 stores various information used, generated, or collected by the GUI design system 106. For example, the database 108 could store various graphics 126 generated by the graphics editor 116. The database 108 could also store widgets 128 generated by the widget editor 118 and GUIs 130 generated by the GUI editor 120. The database 108 could store any other or additional information. The database 108 includes any hardware, software, firmware, or combination thereof for storing and facilitating retrieval of information. The database 108 may also use any of a variety of data structures, arrangements, and compilations to store and facilitate retrieval of information.

Among other things, the GUI design system 106 supports lower fidelity GUI prototyping and higher fidelity GUI prototyping. The GUI design system 106 provides an editing environment for both widgets and GUIs, and placeholder widgets are provided and can contain lower fidelity sketches or other graphics content. During prototype evolution, content in a GUI can be refined, such as by evolving or transforming placeholder widgets into more refined widgets that can be used in higher fidelity prototypes. Widget transformations can be invoked to transform a placeholder widget into another type of widget, where properties with the same semantics are retained during the transformation. As an example, to transform a label placeholder widget into a button, layout information can be kept the same, and the placeholder widget's text can be transferred to the button's caption (without requiring user input).

In this system 100, higher and lower fidelity prototyping can be mixed as desired, and prototypes could be transferred from one fidelity level to another fidelity level smoothly. Moreover, all prototyping content for a graphical user interface could be stored in a common artifact, which represents a data structure or other mechanism used to store information related to the GUI. The artifact could be managed by the version tracker 122 and stored in the database 108. Further, once input into the system 100, a GUI prototype could be modified or otherwise worked on by one or multiple users, and the same artifact could be transformed from lower to higher fidelity levels by those users.

Although FIG. 1 illustrates an example system 100 for designing GUIs having different fidelities, various changes may be made to FIG. 1. For example, the system 100 may include any number of user devices 102, networks 104 (wired or wireless), GUI design systems 106, and databases 108. Also, the functionality of the GUI design system 106 could be implemented on any suitable computing device(s), such as a desktop computer, a laptop computer, or a server computer. Further, while FIG. 1 illustrates that one database 108 is coupled directly to the GUI design system 106, any number of databases 108 may reside at any location(s) accessible by the GUI design system 106. In addition, while FIG. 1 illustrates one operational environment in which GUI design functionality could be used, this functionality could be used with any suitable device and in any suitable system.

Figure 2:
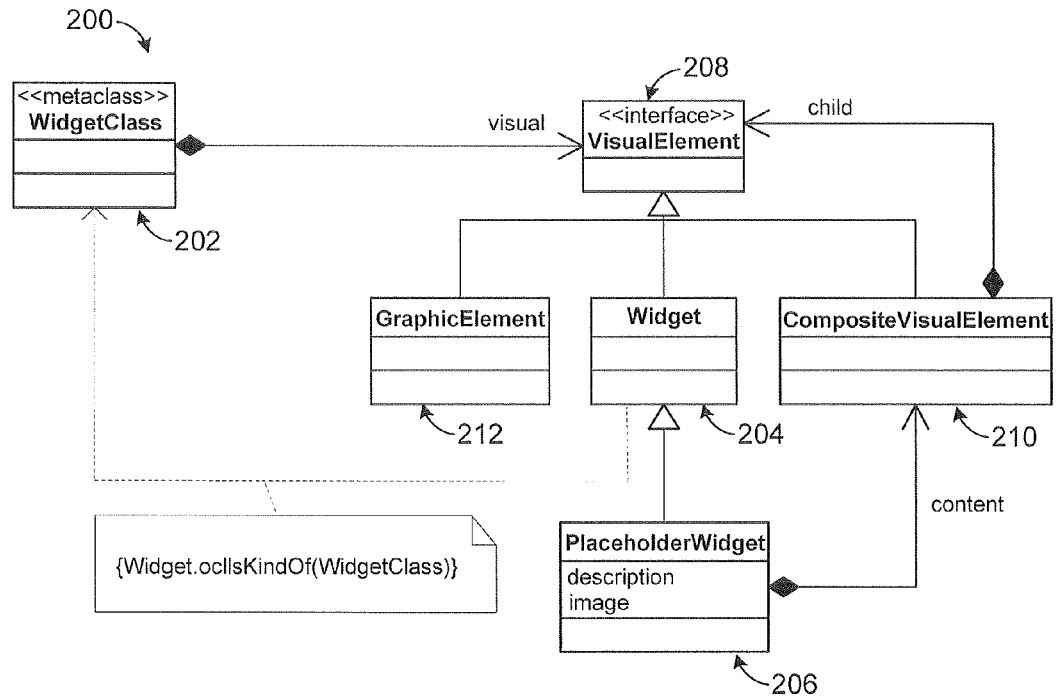
FIG. 2 illustrates an example model for designing GUIs having different fidelities according to this disclosure.

FIG. 2 illustrates an example model 200 for designing GUIs having different fidelities according to this disclosure. The embodiment of the model 200 shown in FIG. 2 is for illustration only. Other embodiments of the model 200 could be used without departing from the scope of this disclosure. Also, for ease of explanation, the model 200 shown in FIG. 2 is described with respect to the system 100 of FIG. 1. The model 200 could be used with any suitable device and in any suitable system.

In this example, the model 200 represents a widget metamodel and includes a widget class 202, which can be used to define instances of at least one particular type of widgets 204. The widget class 202 defines various aspects of the particular type of widget 204, such as the general appearance of those widgets 204. Instances of the widgets 204 represent specific implementations of the widgets and can define aspects of those specific implementations, such as the text or other content associated with the instances.

As shown here, instances of placeholder widgets 206 can also be defined, where each instance of the placeholder widgets 206 could include a specified description, an image, or other content. Each instance of the placeholder widgets 206 can be used in a GUI to hold the place for a non-placeholder widget, which can be inserted into the GUI at a later time. Each instance of a placeholder widget 206 can also be transformed or converted into an instance of a widget 204.

The instances of the widgets 204 can be used to define one or more visual elements 208. A visual element 208 defines a specific area of a GUI. Each visual element 208 could include at least one of the widgets 204, and the appearance of those widgets 204 may be at least partially based on visual definitions from the widget class 202. The visual element 208 can also inherit properties from one or more composite visual elements 210, each of which represents a collection of widget elements. The composite visual element 210 could also contain the contents of one or more instances of placeholder widgets 206, allowing the contents of the placeholder widgets 206 to be inserted into the visual element 208. Each visual element 208 may also include graphics provided by one or more graphics elements 212, which contain images, graphics, or other content to be inserted into the visual elements 208. The graphics elements 212 could be used to define the appearance of the widgets 204.

In some embodiments, a new widget class 202 can be defined for each type of widget being used in the system 100. Also, the GUI editor 120 can use instances of the widgets 204 to form a GUI prototype. Further, the widget editor 118 can be used to create or edit graphics elements 212 and widgets 204 as part of the appearance of the widget class 202. Once the widget class 202 is defined, it could be used by the GUI editor 120 to create specific instances of the widgets 204 for use in creating the GUI prototype.

The widget class 202 could also be used by the widget editor 118 to define another widget's appearance. Moreover, instances of the placeholder widgets 206 could be used in the GUI editor 120 to hold the place for non-placeholder widgets, and the graphical or other content of a placeholder widget 206 could be a graphical element 212 or an existing widget 204. In addition, a new widget class 202 could be created from a placeholder widget 206, where the graphical or other content of the placeholder widget 206 is used as the appearance of the new widget class 202.

To use the placeholder widgets 206, users could define the placeholder widgets 206 and place instances of the placeholder widgets 206 in the main frame or layout of various GUI prototypes. The users could also refine the placeholder widgets 206 over time, such as by selecting graphical elements 212 or other existing widgets 204 as the content of the placeholder widgets 206. Once the content of a placeholder widget 206 is mature enough, the placeholder widget 206 is used in multiple GUIs, or at other times, a user could create a new widget 204 from the placeholder widget 206. The appearance of the new widget 204 may be based on the content of the placeholder widget 206. The GUI editor 120 could update GUI prototypes that previously contained the placeholder widget 206 with instances of the new widget 204.

In this way, the model 200 supports the use of placeholder widgets 206, as well as the evolution of those placeholder widgets 206 (via transformation) without requiring reentry of data associated with the transformed widgets. Moreover, this model 200 allows both higher and lower fidelity widgets to be used at the same time in a GUI prototype and allows for simpler and more rapid development of widgets and GUIs.

Although FIG. 2 illustrates an example model 200 for designing GUIs having different fidelities, various changes may be made to FIG. 2. For example, the model 200 could include any other or additional classes or other components. Also, any suitable relationships may exist within the model 200 between the various classes or other components.

FIGS. 3A through 7 illustrate example techniques for designing GUIs having different fidelities according to this disclosure. The example techniques shown in FIGS. 3A through 7 are for illustration only. Other techniques could be used without departing from the scope of this disclosure. Also, for ease of explanation, the techniques shown in FIGS. 3A through 7 are described with respect to the system 100 of FIG. 1. These techniques could be used with any suitable device and in any suitable system.

Figure 3A:
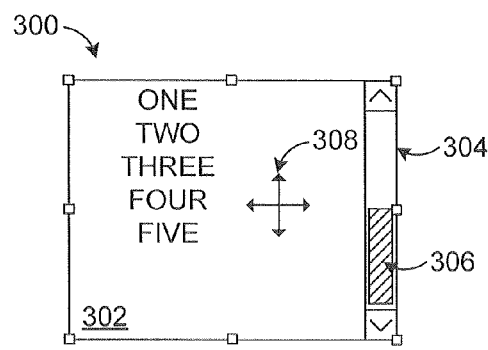

In FIGS. 3A through 3D, an existing widget used in an existing GUI (as defined by the GUI editor 120) is revised using the widget editor 118. In FIG. 3A, an instance of a list widget 300 is used as part of a GUI and is displayed by the GUI editor 120. The list widget 300 includes a viewport 302 and a scrollbar 304. The viewport 302 represents the area of the list widget 300 where text, graphics, or other content is displayed to a user. The scrollbar 304 allows the user to control the content that is displayed in the viewport 302. The scrollbar 304 includes a slider 306, which can be selected by the user to scroll (up or down in this example) through the content in the viewport 302.

Figure 3B:
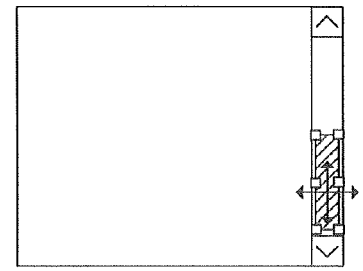

When an instance of the list widget 300 is displayed as part of a GUI prototype by the GUI editor 120, the user could select the instance of the list widget 300 for editing. For example, the user could double-click on the instance of the list widget 300 using a cursor 308 controlled by a mouse or other input device. Selecting the instance of the list widget 300 displayed by the GUI editor 120 could invoke the widget editor 118. This is shown in FIG. 3B, where the widget editor 118 displays the list widget and allows the user to alter the sub-components forming the list widget. Here, the user selects the scrollbar slider 306, such as by double-clicking on the scrollbar slider 306 or right-clicking on the scrollbar slider 306 and selecting an appropriate popup menu item.

Figure 3C:
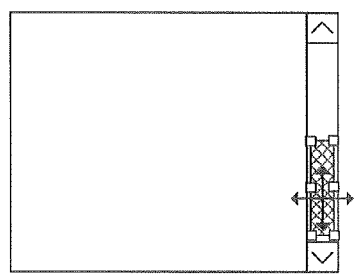
Figure 3D:
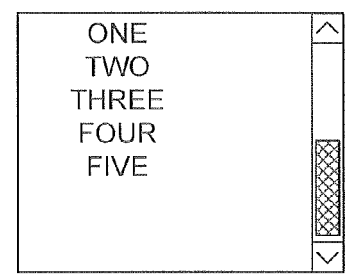

As shown in FIG. 3C, the user has changed the shading of the scrollbar slider 306. The user could also change the color, style, or other property of the scrollbar slider 306. Once complete, the widget editor 118 saves the changes to the list widget. The GUI editor 120 updates the instance of the list widget 300 displayed by the GUI editor 120, which is illustrated in FIG. 3D. The instance of the list widget 300 now contains the scrollbar slider 306 with its new shading.

In this way, the appearance of a widget can be defined or modified in the widget editor 118. If a widget is modified in the widget editor 118, instances of that widget presented by the GUI editor 120 can be updated automatically once the modifications are complete.

Figure 4:
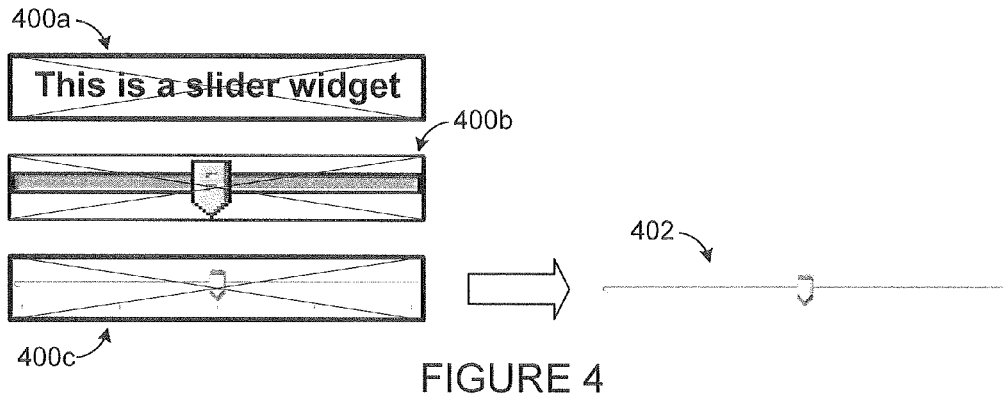

FIG. 4 illustrates the use of a placeholder widget in a GUI. In FIG. 4, three different placeholder widgets 400a-400c are illustrated. In this example, these placeholder widgets 400a-400c represent a "slider" for sliding a view horizontally left and right. Here, the placeholder widget 400a has a text property, which uses text to indicate that the placeholder widget 400a represents a slider. The placeholder widget 400b has an image property, which represents (in relatively low quality form) that the placeholder widget 400b represents a slider. The placeholder widget 400c has a graphics property, which represents (in relatively high quality form) that the placeholder widget 400c represents a slider.

Any of the placeholder widgets 400a-400c could be selected by a user and placed into a GUI being created or modified using the GUI editor 120. For example, when a new GUI is being created, a user could first insert the placeholder widget 400a into the GUI. At a later time, the user could replace the placeholder widget 400a with the placeholder widget 400b to give a more accurate appearance to the GUI. The user could later replace the placeholder widget 400b with the placeholder widget 400c, which could represent the general form of the slider that is going to be included in the final version of the GUI. The user could use the content from the placeholder widget 400c to create an actual slider widget 402. Once created, the slider widget 402 could be included in one or multiple GUIs. The slider widget 402 could also be edited, such as by changing the size, shape, or color of the slider widget 402.

Figure 5A:
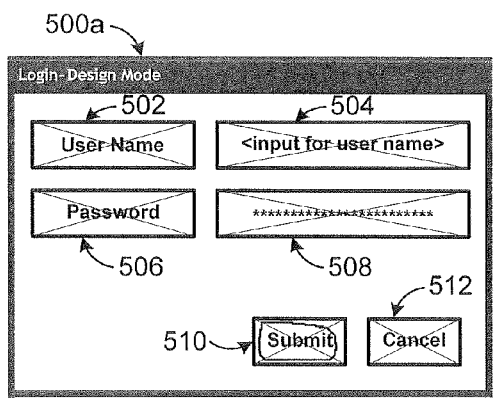

FIGS. 5A through 5D illustrate the use of placeholder widgets in the design of a login window for an application. In FIG. 5A, a login window 500a includes two placeholder widgets 502-504 defining an input for receiving a username and two placeholder widgets 506-508 defining an input for receiving a password. Here, the placeholder widgets 502 and 506 are used to represent labels. The placeholder widgets 504 and 508 are used to represent text boxes, where the text boxes would be used to receive the username and password.

Also included in the login window 500a are two placeholder widgets 510a-512 representing buttons that could be selected during a login process. In this example, the button 510 includes both a text property (the word "Submit") and an image property (the roughly drawn oval), while the button 512 only includes a text property. Note that the login window 500a represents a lower fidelity prototype containing lower fidelity widgets (all of the placeholder widgets 502-512). However, the system 100 allows this login window 500a to be defined very quickly by simply adding various placeholder widgets (many or all of which could be defined already) to the interface prototype.

Figure 5B:
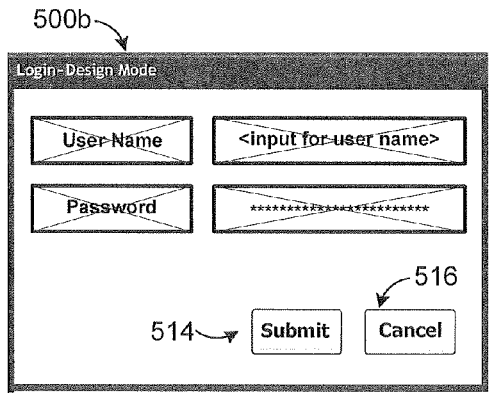

FIG. 5B illustrates a login window 500b that includes different types of widgets (placeholder and non-placeholder widgets). In this example, the login window 500b includes the same placeholder widgets 502-508 as shown in FIG. 5A, and two label widgets 514-516 have replaced the lower fidelity placeholder widgets 510-512. It can be seen here that a prototype GUI can include any suitable widgets and is not limited to just placeholder widgets.

Figure 5C:
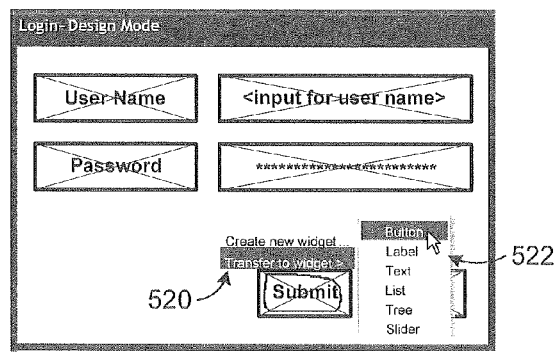

FIG. 5C illustrates the transformation of a lower fidelity placeholder widget into a higher fidelity non-placeholder widget. In this example, the user is attempting to transform the placeholder widget 510 into a non-placeholder button widget. Here, the user has selected the placeholder widget 510 and initiated a context menu 520, such as by right-clicking the placeholder widget 510. The menu 520 allows the user to indicate whether the user wishes to create a new widget or transfer the placeholder widget's data to a specified type of non-placeholder widget. The user here has selected the second option (transfer to a specified type of non-placeholder widget), which presents the user with another menu 522. The menu 522 identifies the various types of widgets that can be selected, including button, label, text, list, tree, and slider types (although any other or additional types could be listed). The user selects a button type of non-placeholder widget in this example.

During the transfer, the GUI editor 120 could replace the placeholder widget 510 with a higher fidelity non-placeholder widget with the same size, shape, and text as the placeholder widget 510. The user here may not be required to define the size, shape, or content of the new button widget since that information is transferred from the existing placeholder widget 510. Moreover, the layout of the login window 500a remains the same, so the user is not required to position the new button widget. This helps to reduce data reentry and saves time during the GUI design.

FIGS. 6A through 6C illustrate the creation and reuse of a placeholder widget. In this example, a login window 600a is being created, and the login window 600a is similar to the login window 500a in FIG. 5A. Here, though, only a single placeholder widget 602 representing a button has been inserted into the login window 600a. The user has selected the placeholder widget 602 and is viewing the menu 520. The user in this example selects the "create a new widget" option in the menu 520.

This action invokes the widget editor 118 and causes the widget editor 118 to display an editor 604. The editor 604 here replicates the form of the selected placeholder widget 602 (namely a roughly drawn rectangle containing text). The user can edit the displayed placeholder widget, such as by entering text into the placeholder widget. In this example, the user enters the word "Cancel" into the placeholder widget to create a new placeholder widget 606, which is inserted into the login window 600a as shown in FIG. 6C. In FIG. 6D, the two placeholder widgets 602 and 606 are converted into non-placeholder button widgets 608-610 using the technique shown in FIG. 5C and described above. This creates a higher fidelity prototype login window 600b.

As can be seen here, the system 100 provides a relatively simple technique to create and reuse placeholder widgets. In this example, a placeholder widget (containing sketch content and representing one button) is reused to create a placeholder widget for another button.

Figure 7:
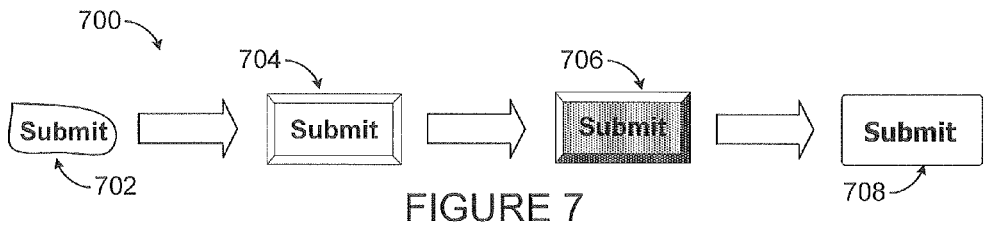

FIG. 7 illustrates one example evolution 700 of a button used in GUIs. The button may initially be represented by a placeholder widget 702, which very low fidelity. The initial widget 702 may evolve into a widget 704 that is more precisely drawn but with relatively few additional details. Later, the widget 704 may evolve into a widget 706 having shading to make it appear three-dimensional. Again, the widget 706 may evolve into a widget 708 that is more two-dimensional with more subtle shading. With each evolution of the button widget, GUI prototypes defined using the GUI editor 120 can be updated automatically with the new button widget. Moreover, data associated with an earlier version can be supplied to the newer version of the widget, reducing the need to reenter data with each evolution.

As shown in FIGS. 3A through 7, the system 100 provides various ways to create and edit placeholder widgets and other widgets, which can be used to define GUI prototypes. As the definitions of those widgets are updated or modified, the corresponding instances of the widgets in the GUI prototypes are also modified. In this way, lower and higher fidelity GUI prototypes can be more easily created, and data can be transferred between the lower and higher fidelity GUI prototypes more easily.

Although FIGS. 3A through 7 illustrate example techniques for designing GUIs having different fidelities, various changes may be made to FIGS. 3A through 7. For example, any suitable mechanism could be used to select a widget sub-component for editing, and any suitable property of the widget sub-component could be edited. Also, other types of placeholder widgets could be used instead of or in addition to placeholder widgets with textual, image, and graphics properties. Furthermore, any suitable GUI prototypes could be created with any combination of placeholder and/or non-placeholder widgets, and any suitable mechanism could be used to invoke functions for creating and transferring widgets. In addition, a widget could undergo any number of revisions during its lifetime.

Figure 8:
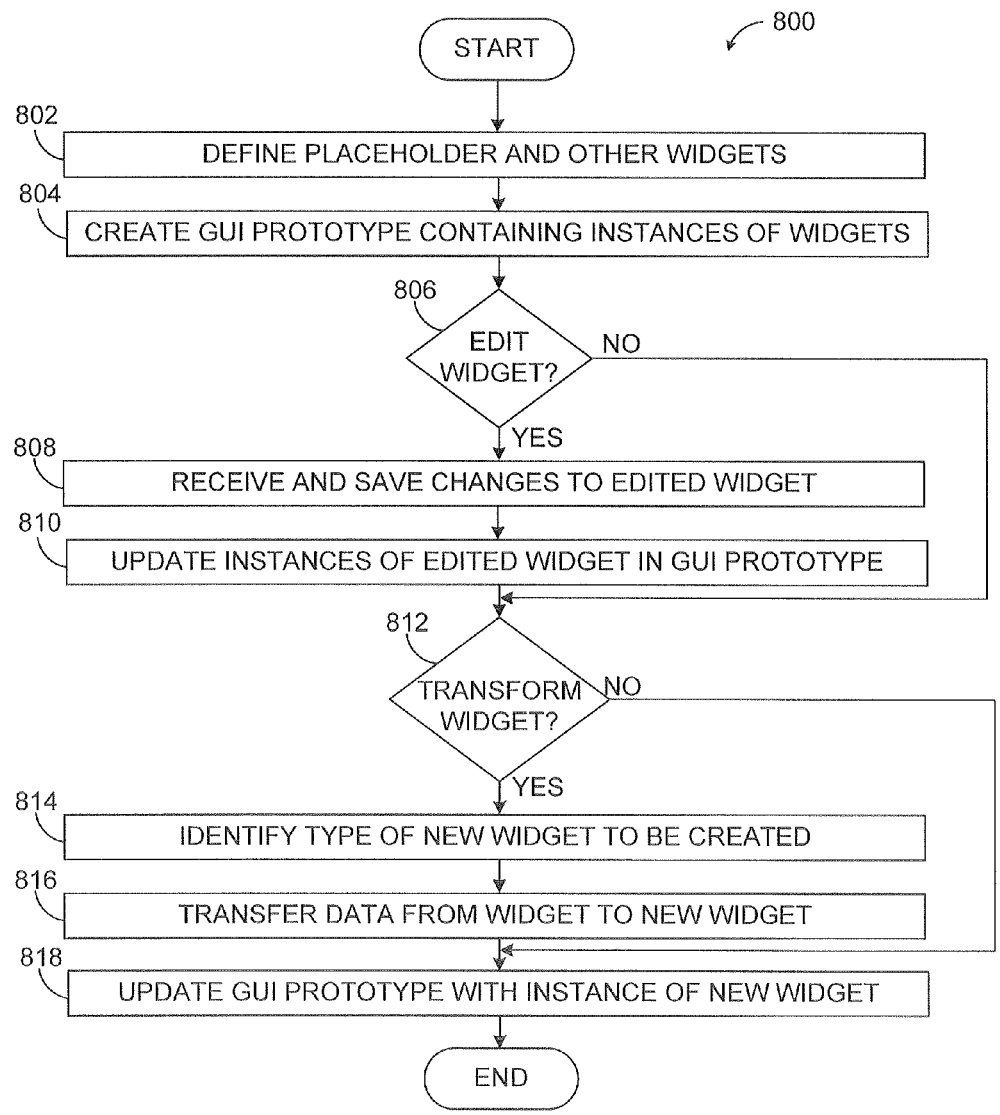
FIG. 8 illustrates an example method for designing GUIs having different fidelities according to this disclosure.

FIG. 8 illustrates an example method 800 for designing GUIs having different fidelities according to this disclosure. The embodiment of the method 800 shown in FIG. 8 is for illustration only. Other embodiments of the method 800 could be used without departing from the scope of this disclosure.

One or more placeholder and other widgets are defined at step 802. This could include, for example, a user using the widget editor 118 to define classes 202 associated with different types of non-placeholder widgets. This may also include the user using the graphics editor 116 to create graphics for one or more placeholder widgets. Any suitable number of placeholder or other widgets could be defined here. Also note that various placeholder or other widgets could be predefined in a system 100, such as when default or custom widgets are provided along with the widget editor 118 or the GUI editor 120.

A GUI prototype containing one or more instances of the widgets is created at step 804. This may include, for example, the user using the GUI editor 120 to insert instances of one or more widgets into a GUI prototype. The instances inserted into the GUI prototype could represent any suitable combination of placeholder and non-placeholder widgets. The GUI prototype could, for instance, include all placeholder widgets or a combination of placeholder and non-placeholder widgets.

If the user wishes to edit a widget at step 806, changes to the widget are received and saved at step 808. This could include, for example, the widget editor 118 presenting the widget to the user and receiving changes to sub-components of the widget. Any instances of the edited widget are updated in the GUI prototype at step 810. This could include, for example, the GUI editor 120 updating a display containing the edited widget to reflect the new properties of the widget, such as its modified sub-components.

If the user wishes to transform a widget (such as a placeholder widget) at step 812, a type of new widget to be created during the transformation is identified at step 814. This could include, for example, presenting the user with a list of possible widget types and receiving a selection of one of the possible widget types. Data is transferred from the widget being transformed to the new widget at step 816. This could include, for example, transferring text, an image, or a graphic from a placeholder widget to the new widget. This may also include transferring data related to the size, shape, or layout of the placeholder widget to the new widget. The GUI prototype is updated with an instance of the new widget at step 818. This may include, for example, the GUI editor 120 replacing an instance of the placeholder widget with an instance of the new widget.

Although FIG. 8 illustrates an example method 800 for designing GUIs having different fidelities, various changes may be made to FIG. 8. For example, while shown as a series of steps, various steps in FIG. 8 could overlap, occur in parallel, occur in a different order, or occur any number of times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   defining, in a widget editor, a placeholder widget comprising a roughly drawn sketch, the placeholder widget having a text property;
   defining, in a GUI editor, a prototype graphical user interface (GUI) comprising an instance of the placeholder widget;
   presenting the prototype GUI to a user, an appearance of the instance of the placeholder widget based on the text property of the placeholder widget;
   in response to a user selection of the instance of the placeholder widget, presenting a list of second widgets to the user and receiving a user selection of one of the second widgets;
   in response to the selection of the selected second widget, replacing the instance of the placeholder widget in the prototype GUI with an instance of the selected second widget and transferring the text property of the placeholder widget to the instance of the selected second widget; and
   updating the presentation of the prototype GUI using the instance of the selected second widget
   wherein the widget editor is separate from the GUI editor.

2. The method of claim 1, wherein replacing the instance of the placeholder widget with the instance of the selected second widget comprises:
   transforming the instance of the placeholder widget into the instance of the selected second widget.

3. The method of claim 2, wherein the instance of the placeholder widget has a lower fidelity than the instance of the selected second widget.

4. The method of claim 1, further comprising:
   tracking, in a version tracker, a creator of the placeholder widget and the selected second widget and changes between the placeholder widget and the selected second widget.

5. The method of claim 1, wherein the selected second widget is stored in a memory independently of the placeholder widget that is also stored in the memory.

6. The method of claim 1, further comprising:
   altering the text property of the placeholder widget; and
   automatically updating the instance of the placeholder widget in the prototype GUI.

7. The method of claim 1, wherein the prototype GUI further comprises an instance of a non-placeholder widget.

8. The method of claim 7, further comprising:
   defining multiple prototype GUIs collectively comprising multiple instances of multiple widgets, wherein at least two of the prototype GUIs have different fidelities.

9. The method of claim 1, wherein:
   defining the placeholder widget comprises receiving first user input at the widget editor;
   defining the prototype GUI comprises receiving second user input at the GUI editor; and
   further comprising invoking the widget editor using the GUI editor.

10. An apparatus comprising:
    at least one memory configured to store information defining a placeholder widget comprising a roughly drawn sketch, the placeholder widget having a text property; and
    at least one processor configured to:
    execute a widget editor configured to define the placeholder widget;
    execute a GUI editor configured to receive information defining a prototype graphical user interface (GUI) that comprises an instance of the placeholder widget, wherein the widget editor is separate from the GUI editor;
    present the prototype GUI to a user, an appearance of the instance of the placeholder widget based on the text property of the placeholder widget;
    in response to a user selection of the instance of the placeholder widget, present a list of second widgets to the user and receiving a user selection of one of the second widgets; and
    in response to the selection of the selected second widget, replace the instance of the placeholder widget with an instance of the selected second widget in the prototype GUI and transfer the text property of the placeholder widget to the instance of the selected second widget.

11. The apparatus of claim 10, wherein the at least one processor is configured to replace the instance of the placeholder widget with the instance of the selected second widget by transforming the instance of the placeholder widget into the instance of the selected second widget.

12. The apparatus of claim 10, further comprising:
    a version tracker configured to track a creator of the placeholder widget and the selected second widget and changes between the placeholder widget and the selected second widget.

13. The apparatus of claim 11, wherein the at least one memory is also configured to store information defining the selected second widget independently of the information defining the placeholder widget.

14. The apparatus of claim 13, wherein the at least one processor is configured to transform the instance of the placeholder widget into the instance of the selected second widget further by:
    inserting the instance of the selected second widget into the prototype GUI in place of the instance of the placeholder widget, wherein a layout of the prototype GUI remains unchanged.

15. The apparatus of claim 10, wherein the instance of the placeholder widget has a lower fidelity than the instance of the selected second widget.

16. The apparatus of claim 10, wherein the at least one processor is further configured to:
    alter the text property of the placeholder widget; and
    automatically update the instance of the placeholder widget in the prototype GUI.

17. The apparatus of claim 10, wherein the prototype GUI further comprises an instance of a non-placeholder widget.

18. The apparatus of claim 17, wherein the at least one processor is configured to receive information defining multiple prototype GUIs collectively comprising multiple instances of multiple widgets, wherein at least two of the prototype GUIs have different fidelities.

19. The apparatus of claim 10, wherein:
    the processor executes the widget editor based on first user input;
    the processor executes the GUI editor based on second user input; and
    the GUI editor is configured to invoke the widget editor in order to edit widgets contained in one or more prototype GUIs.

20. A non-transitory computer readable medium embodying a computer program, the computer program comprising:
    computer readable program code for defining, in a widget editor, multiple widgets including a placeholder widget comprising a roughly drawn sketch, the placeholder widget having a text property;
    computer readable program code for defining, in a GUI editor, multiple prototype graphical user interfaces (GUIs) comprising multiple instances of multiple widgets, at least one of the instances comprising an instance of the placeholder widget;
    computer readable program code for presenting the prototype GUIs to one or more users, an appearance of the instance of the placeholder widget based on the text property of the placeholder widget;
    computer readable program code for, in response to a user selection of the instance of the placeholder widget, presenting a list of second widgets to the user and receiving a user selection of one of the second widgets; and
    computer readable program code for, in response to the selection of the selected second widget, replacing the instance of the placeholder widget with an instance of the selected second widget in at least one of the prototype GUIs and transferring the text property of the placeholder widget to the instance of the selected second widget, the instance of the selected second widget having a higher fidelity than the instance of the placeholder widget
    wherein the widget editor is separate from the GUI editor.

* * * * *